3,794,581
WASTEWATER TREATMENT
Mathew M. Zuckerman, Palo Alto, Calif., and Alan H. Molof, New City, N.Y., assignors to Envirotech Corporation, Salt Lake City, Utah
Continuation-in-part of application Ser. No. 768,378, Oct. 17, 1968, now Patent No. 3,635,817, which is a continuation-in-part of application Ser. No. 824,709, May 14, 1969, now Patent No. 3,676,334. This application Jan. 17, 1972, Ser. No. 218,254
Int. Cl. C02c 5/02
U.S. Cl. 210—9                    13 Claims

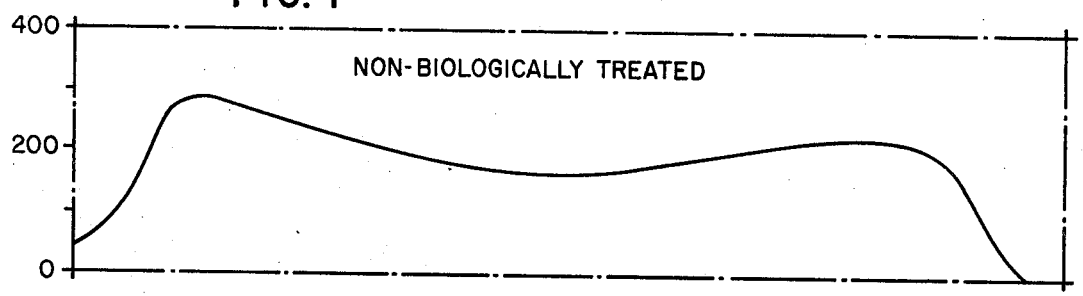
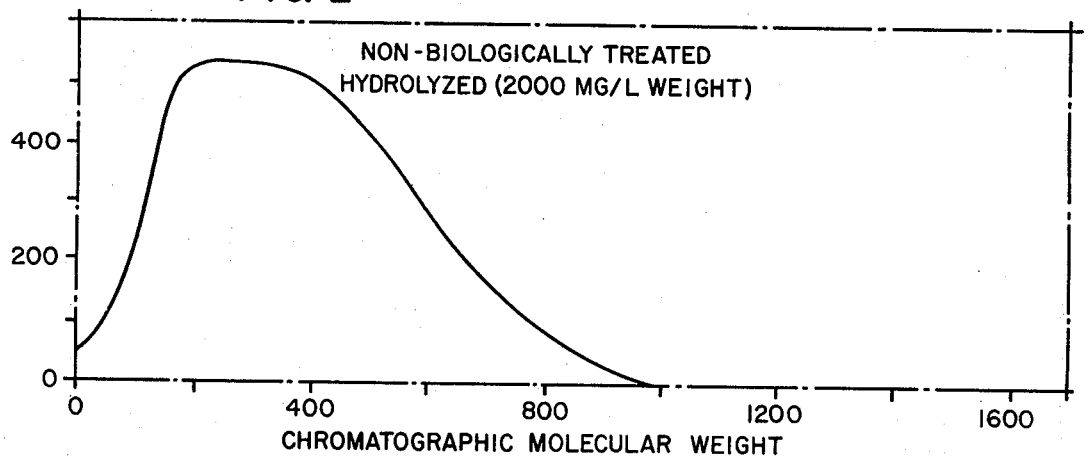
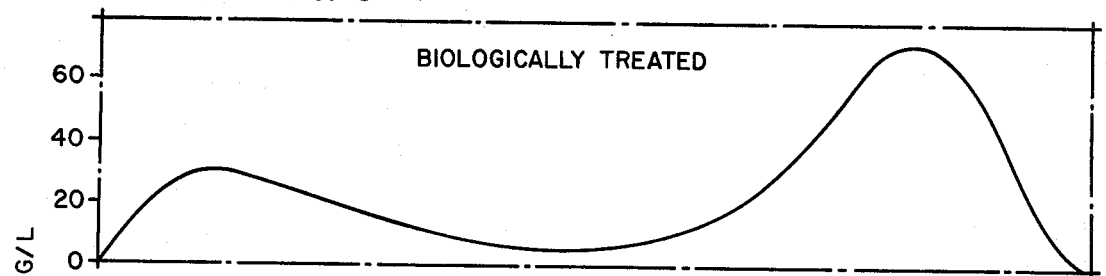
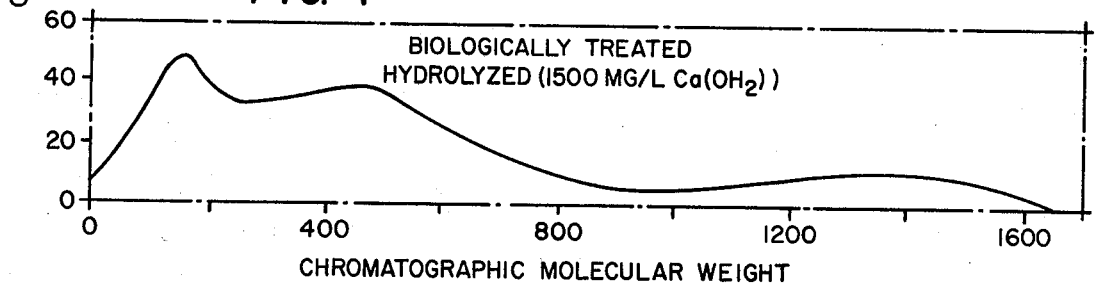

ABSTRACT OF THE DISCLOSURE

A treatment sequence for raw wastewater of a type which includes a high proportion of a poorly sorbable material comprising biological treatment, hydrolysis and adsorption of either a physical or biological type. During biological treatment one portion of the poorly sorbable material is respired while another portion is converted into a high molecular weight material. During hydrolysis, the latter material is converted into a low molecular weight material of substantially improved sorbability in comparison to the porly adsorbable material originally in the raw wastewater.

CROSS-REFERENCE TO RELATED APPLICATIONS

This application is a continuation-in-part of U.S. patent application Ser. No. 768,378, now U.S. Pat. 3,635,817 entitled, "Wastewater Treatment Process," in the names of Mathew M. Zuckerman and Alan H. Molof, filed Oct. 17, 1968, and also of U.S. patent application Ser. No. 824,-709, now U.S. Pat. 3,676,334 entitled, "Wastewater Treatment Sequence," to the same inventors, filed on May 14, 1969.

BACKGROUND OF THE INVENTION

This invention relates generally to wastewater treatment and more specifically to an improved process for treating certain types of municipal and industrial wastewater by a novel treatment sequence adapted to control the nature and molecular weight distribution of the soluble organic material so as to optimize processing to obtain the highest effluent quality.

Municipal wastewaters often contain industrial discharges as well as domestic discharges. These discharges generally contain a very complex mixture of soluble and insoluble organic and inorganic contaminants. Most often, wastewater purification is directed towards removing the organic contaminants which can be measured in terms of biochemical oxygen demand (BOD), chemical oxygen demand (COD), or total organic carbon (TOC). The standard technique for determining BOD requires 5 days while COD can be measured in considerably less time. Suitable analysis techniques for both values are described in "Standard Methods for the Examination of Water and Wastewater," 13th edition, New York: American Public Health Association (1971).

There are numerous methods of removing the insoluble organic contaminants well known to those skilled in the art of water and wastewater processing, i.e., settling, coagulation, filtration and flotation. However, there are only two methods commonly employed for removing the soluble organic contaminants from wastewater: biological sorption-oxidation and physical adsorption.

Biological (e.g. activated sludge or trickling filter) treatment has been used by itself to substantially reduce the particulate organic material in wastewater but is not very effective in the removal of soluble organic matter from the same. As disclosed in the article by Zuckerman, M. M., and Molof, A. H., entitled, "High Quality Reuse Water by Chemical-Physical Wastewater Treatment," J. Water Pollution Control Federation, pp. 437–463 (March, 1970), hereinafter the Zuckerman et al. article, a major cause for such inefficient removal is a molecular weight shift. That is, during conventional biological treatment one portion of the low molecular weight (e.g. less than 400) soluble organic material is respired (oxidized) and another portion is converted into high molecular weight (e.g. greater than 1200) soluble material. Thus, after biological treatment a large quantity of high molecular weight organic soluble material remains in the wastewater. After adsorption by activated carbon, the wastewater retains a relatively high COD. This may be explained by reference to the structure of activated carbon which has a limited external surface area and a vast internal channel network. In the internal channel network are macropores of large diameters and micropores of small diameters. Wastewater generally contains small and large molecular materials. Each molecule, depending on its size, has accessibility to a certain portion of these pores. Small molecules have access to the major portion of these pores and consequently of the total adsorption areas and are therefore favored for adsorption over large molecules. The larger molecules can be effectively prevented from adsorption within certain pores due to (a) physical blockage or (b) an insufficient rate of movement into the pore. As the diameter of the molecule approaches that of the surrounding pore passage, intrapartical resistance increases causing a reduction in the rate of movement to the site of adsorption. Thus, even though a molecule has a diameter less than that of its pore passage, it may still be large enough to reduce its rate of travel to a value that prevents adsorption deep within the interior pores of the carbon. The high molecular weight material is too large for ready access into the micropores and so is adsorbable only on the limited external surface and large micropores. After relatively fast saturation of this area, such materials "break through" the activated carbon with only minor adsorption thereon.

The molecular weight of the high molecular weight soluble organic material of wastewater may be shifted to essentially all low molecular weight (e.g. less than 400) material by hydrolysis as by pH adjustment as with lime. This is described fully in the above Zuckerman et al. article. The low molecular weight material is small enough to be readily accessible into the micropores of activated carbon for high adsorption. A two-step sequence including only hydrolysis and adsorption performed on the wastewater of the Zuckerman et al. article produced a superior effluent in comparison to that produced by a three-step treatment including, in order, biological treatment, hydrolysis and adsorption. One logical explanation for this is that the biological treatment produces a wastewater with a relatively large portion of the soluble organic material characterized by a high molecular weight which is not completely hydrolyzed prior to adsorption.

SUMMARY OF THE INVENTION AND OBJECTS

It is an object of the present invention to provide a process for the treatment of wastewater to produce a high quality effluent in an efficient manner.

It is a particular object of the invention to provide a process of the above type which is extremely effective in the treatment of wastewater including a soluble organic component with a high proportion of a poorly sorbable low molecular weight material. It has been found that a two-step process of hydrolysis and adsorption is inadequate for certain effluent standards for the treatment of certain types of wastewater which contain such poorly sorbable materials.

Additional objects and features of the invention will appear from the following description in which the preferred embodiment is set forth in conjunction with the accompanying drawings.

In accordance with the above objects, a system is provided for the treatment of raw wastewater of a type which includes a soluble organic component with a high proportion (e.g. at least 25% by weight) of a poorly sorbable (e.g. less than 60% on virgin or regenerated activated carbon) low molecular weight material. Exemplary of such poorly adsorbable materials are sugars and neutral alpha-amino acids such as glucose, sucrose, glycine, alanine, syrine, and N phenyl glycine. The system includes, in order, biological treatment, hydrolysis and sorption. During biological treatment, one portion of the low molecular weight material is respired while another portion is converted into a high molecular weight material. The biological treatment is preferably of sufficient extent to eliminate substantially all of the poorly adsorbable low molecular weight soluble material. After biological treatment, the wastewater is hydrolyzed to convert a substantial portion of the high molecular weight material into low molecular weight material having a substantially improved sorbability as determined by percentage adsorption on activated carbon (e.g. 80% or higher) in comparison to the starting low molecular weight material.

To determine the applicability of the present process, the quality of a wastewater sample effluent from hydrolysis and adsorption is compared either to the quality of another sample treated in accordance with the present invention or to a minimum effluent standard.

After hydrolysis, the wastewater is treated for sorption either by contact with a physical adsorbent material such as activated carbon or by passage through a biologically sorbent medium such as slimes made up of a mixed population of autotrophic and heterotrophic organisms.

BRIEF DESCRIPTION OF THE DRAWINGS

FIGS. 1–4 are graphs illustrating comparative molecular weight distribution of a number of treated and untreated wastewater samples.

DETAILED DESCRIPTION OF THE PREFERRED EMBODIMENTS

For certain types of wastewater, a treatment sequence of hydrolysis followed by sorption, as on activated carbon, produces an effluent having a low COD value. This is fully described in the aforementioned applications Ser. Nos. 768,378 and 824,709, incorporated herein by reference. It has been determined that there are certain types of wastewater for which such treatment is beneficial but is inadequate for certain requirements. The present invention is predicated upon the discovery that a high quality effluent may be obtained by the treatment of raw wastewater in the following sequence of steps: (a) biological treat, (b) hydrolysis, and (c) sorption. The above treatment sequence is applicable to the processing of wastewater including a soluble organic component with a high proportion of poorly sorbable low molecular weight material.

This process finds particular utility where such poorly sorbable material is present in raw wastewater in an amount of at least 25% by weight of the soluble organic component. Such wastewaters may be emitted from either industrial or municipal sources. However, the process is particularly applicable to pharmaceutical wastewaters.

For purposes of the present invention, high molecular weight materials generally have a molecular weight of greater than a value on the order of about 1200–2000 while low molecular weight materials generally have a lower molecular weight. Because of the complex nature of wastewater, it is apparent that such values more closely approximate average molecular weights and thus a certain degree of latitude should be provided when referring to the recited ranges. The method employed for defining the molecular weight ranges used herein is by liquid chromatographic separation as described by Zuckerman, M. M., in "Chemical Versus Biological Wastewater Treatment in Production of High-Quality Reuse Water," PhD. Thesis, New York University, New York, N.Y., 1969. The molecular weights recited herein are therefore more accurately chromatographic molecular weight rather than absolute molecular weights. However, the relationship between the two appear to be quite close, particularly at the lower molecular weight ranges.

As briefly discussed above, low molecular weight soluble organic materials are better adapted for sorption than high molecular weight materials. That is why the process described in the above WPCF Journal and copending patent applications includes a hydrolysis step to lower the molecular weight of the organic soluble material prior to sorption. This technique is highly effective for producing a high quality wastewater effluent as long as the raw wastewater does not contain a relatively high proportion of low molecular weight materials having poor sorbability. However, when such materials are found to be present in wastewaters to a degree sufficient to substantially effect sorption, the present invention would be applicable.

For example, in a publication of the U.S. Department of the Interior designated WP–20 AWTR–19 and entitled, "Advanced Waste Treatment" (1964–1967) certain low molecular weight soluble organic components of wastewater were recited to have the following adsorbability on fresh activated carbon:

TABLE I

| Substance | Percent adsorbed |
| --- | --- |
| Glucose | 8 |
| Sucrose | 37 |
| Glycine | 1 |
| Alanine | 1 |
| Syrine | 0 |
| N phenyl glycine | 48 |

These values were determined in batch-adsorption tests using 100 mg./l. of powdered carbon with a concentration of the compounds in water of 100 mg./l. Thus, the process of the present invention is particularly well suited to treating wastewater containing a substantial quantity of one or more of the above poorly sorbable low molecular weight soluble organic compounds. Other materials having a sorbability of less than 50 or 60% would be included in the poorly sorbable classification. It is believed that low molecular weight sugars and neutral alpha-amino acids comprise the most troublesome of these poorly adsorbable materials. It has been hypothesized, with a certain amount of support, that the sorption of amino acids are strongly influenced by the pH value during adsorption. For purposes of the present invention, sorbability upon activated carbon will be defined as being at the pH value at which sorption would normally occur, e.g. around a neutral pH or a pH of about 7.0.

A wastewater of the foregoing type having a significant poorly sorbable soluble portion undergoes a series of complex reactions during conventional biological treatment, many of which are still not fully understood. In any case, studies have indicated that the low molecular weight soluble organic material, rather than the more complex high molecular weight material, is preferentially attacked or acted upon by the biological medium. The result of such reaction is that some of the material is respired or oxidized to less complex forms and ultimately to carbon dioxide and water while another portion of the low molecular weight material is converted to soluble high molecular weight material which when subsequently hydrolyzed, (as described hereinafter) forms a low molecular weight material which is more readily adsorbable than the initial material. In other words, the hydrolyzed low molecular weight materials take on different properties, one of which being improved adsorption characteristics.

Biological treatment may be of the type employed for conventional secondary waste treatment systems such as trickling filter or activated sludge treatment. In the trickling filter process, the primary treated wastewater is sprayed over a bed of rocks or redwood slats or plasticized media upon which bacteria have been cultivated. The bacteria sorb portions of the organic materials from the wastewater during flow thereby and later oxidizes a portion of this material by exposure to air. In the activated sludge process, the wastewater flows into long and narrow aerated tanks where bacteria are permitted to grow in flocs or clusters upon which a portion of the organic material in the wastewater is sorbed and metabolized. The wastewater then is directed into a settling tank wherein the bacteria flocs settle where some portion is returned to the head of the aeration tank, and another portion is wasted while clarified wastewater is removed from the top of the settling tank. Another form of biological treatment is by simple aeration in the presence of biological microorganisms present in the wastewater.

The biological treatment of the present invention is preferably of sufficient extent to eliminate substantially all of the above type of poorly sorbable material. This degree of treatment will be dependent upon the type of wastewater, the concentration of the microorganisms and the time of treatment. For example, in an aeration system wherein the microorganisms are in low concentration, the treatment may continue for as long as 20 to 30 hours or more. On the other hand, in an activated sludge treatment in which say about 1,000 to 10,000 parts per million of microorganisms are present as measured as mixed liquor volatile suspended solids substantially less time would be required such as on the order of a few hours. For reasons that will be more apparent hereinafter, the biological treatment preferably should not proceed for an excessive period of time. If it does, it is possible that certain high molecular weight materials, such as lipids and certains polysaccharides, will be formed which are more difficult to hydrolyze or break down into low molecular weight materials, and, consequently, a longer hydrolysis step would be required. Economic considerations dictate that only that degree of biological treatment which is necessary for eliminating the poorly adsorbable materials be employed. However, it should be noted that even if the wastewater is moderately overtreated, the process still produces a higher quality effluent than is available in conventional processes.

After biological treatment of the above type, the effluent is passed into a hydrolysis zone in which the high molecular weight soluble organic materials are hydrolyzed or broken down into low molecular weight materials of improved sorbability in an activated carbon in contrast to the poorly adsorbable materials present in the starting wastewater. The hydrolytic technique employed should be adapted to the general make-up of the biologically treated wastewater to be hydrolyzed. For a typical wastewater, hydrolysis may be accomplished by raising the pH of the wastewater to a value in the range of 9.5 to 12.5 or more by the addition of an alkali mateial such as lime or caustic soda. Another technique is the addition of a strong acid such as sulfuric or hydrochloric acid to lower the pH of the wastewater to a pH conducive to hydrolysis. Still a third technique is the addition of the complex organic substances found in animal and plant tissues known as enzymes which can be specific to the particular organic material to be hydrolyzed (e.g. proteinases and carbohydrases). The high molecular weight organic material includes a high proportion of carbohydrates such as polysaccharides and also of high molecular weight polypeptides such as proteins. In general, the acidic or basic pH adjusting chemicals and the enzymes function as catalysts for shifting the equilibirium in the direction of hydrolysis. Other conditions such as temperature, pressure and concentrations may also be employed to vary the rate of reaction or equilibrium results.

It has been determined that the low molecular weight soluble products obtained by biological treatment followed by hydrolysis have a substantially improved sorbability in comparison to (a) the high molecular weight material formed during only biological treatment and (b) to the poorly sorbable low molecular weight material found initially in raw wastewater. It has been found that the adsorbability of a biologically treated-hydrolyzed low molecular weight material is vastly increased, e.g. to a value of 80 to 90% over other low molecular weight materials. This indicates that the low molecular weight material formed by biological treatment followed by hydrolysis is of a different character than the initial low molecular weight material and, for some reason, which is not now completely understood, results in improved sorption.

To complete the wastewater treatment sequence, after hydrolysis the effluent is passed to a sorption zone of either the physical or biological type. The most common form of physical sorption is treatment with activated carbon in either a granular or powdered form. At the present, it is found that a granular form is more convenient in the removal of the COD due to the practicality of thermal regeneration in multi-hearth furnaces. A typical type of activated carbon for purposes of the present invention is one sold by the Calgon Corporation under the trade name Calgon Filtrasorb 400, 12 x 40 mesh granular activated carbon. Physical adsorbent materials other than activated carbon which may be employed in the present invention include chars, activated silica, coals, and activated alumina.

Conventional biological sorption-oxidation treatment may be used as a sorption technique in place of adsorption on activated carbon according to the present invention. Such treatment involves in one example passing a wastewater over a biological slime layer in which there is relative movement between the wastewater and the slime layer. Techniques for relative movement include contact between the wastewater and the biological organisms in which the liquid passes a fixed surface of attached growth (or the reverse motion) or the dispersion of the growth throughout the liquid. Also both streams could flow concurrently. Biological treatment followed by hydrolysis prior to biological sorption-oxidation will improve the results of adsorption in an analogous manner to that of physical adsorption as described above. It is believed that there is a synergistic improvement in the effect of biological treatment and hydrolysis before biological sorption as well as before physical adsorption. The molecular size is a major factor in determining the permeability of a molecule across the outer membrane of a microorganism. Permeability increases as size decreases. Metabolic oxidation by the organism and consequent removal of the molecule from the wastewater takes place after passage through the membrane. Therefore, hydrolysis before biological treatment to lower the molecular weight will increase the ability of the organic molecules to be treated by biological sorption processes within the microorganism. In the absence of hydrolysis prior to biological treatment, it would be necessary for extracellular enzymes to be secreted first by the microorganism to reduce the molecules to a size which is transferable across the membrane into the cell.

As discussed above, the sequence of biological treatment, hydrolysis and sorption is most advantageous in the purification of raw wastewater with a high proportion of poorly adsorbable material. The aforementioned measure of this wastewater property is the percentage of poorly adsorbable material in the soluble organic portion of raw wastewater. This is a difficult determination because of the many components of wastewater at very low concentration levels.

In view of the above, an empirical procedure is provided to determine the poorly adsorbable material level which is easier to carry out than the aforementioned one. According to this technique, a sample of raw wastewater is first hydrolyzed to convert a substantial portion of high molecular weight soluble material therein into low molecular weight soluble material in accordance with the procedures set forth herein. Thereafter the hydrolyzed wastewater sample is contacted with an adsorbent material of either the physical adsorption type, such as activated carbon, or a biological sorption-oxidation type to remove soluble material according to the above techniques.

The effluent is tested (e.g. by the COD procedure set forth in the above Zuckerman et al. article) to determine what amount of the total soluble organics present in the wastewater had been removed. If the amount is less than a predetermined amount, such as an amount of between 80–95% or higher of the initial total soluble organic concentration of the wastewater (normally measured as COD or BOD), a predetermined minimum effluent standard has not been achieved. This minimum standard may also be identified by absolute effluent COD and/or BOD values. For example, if the BOD and/or COD values of the effluent are greater than 10 mg./l. and 35 mg./l., respectively, the minimum effluent standard has not been met. Although these minimum effluent standards can vary from time to time, they do identify or define the type of feed which is to be used in practicing this invention. In other words, if the tests show that a substandard effluent would be obtained, i.e., an effluent which fails to meet the minimum effluent standards, the process of this invention is applied to the raw wastewater for upgrading the effluent to a value above the minimum standard (e.g. BOD and COD values of less than 10 mg./l. and 35 mg./l., respectively). Whereever the term "minimum effluent standard" is used in the disclosure and claims of this application, the above explanation or definition shall apply.

If after adsorption the effluent is below the above minimum standard, a logical explanation is that a relatively high proportion of soluble components of the raw wastewater are poorly adsorbable. Hydrolysis shifts the molecular weight distribution so that there is present primarily only low molecular weight material which is of a readily adsorbable size. Therefore, it is concluded that the low standard product is caused by the original presence of poorly sorbable soluble low molecular weight material.

The degree of biological treatment and of hydrolysis varies in accordance with the quality of the raw wastewater and the desired quality of the final effluent. To determine the optimum degree of biological treatment the raw wastewater may be treated with various concentrations of biological organisms for various periods of times and monitoring as by chromatography for the conversion of low molecular weight poorly adsorbable materials by trial and error. In like manner the conditions of hydrolysis (e.g. pH levels) may be varied and chromatographically monitored for optimization.

In order to more clearly disclose the nature of the present invention, specific examples are hereinafter given on a variety of starting materials. It should be understood, however, that this is done by way of example and is intended neither to delineate the scope of the invention nor limit that of the appended claims.

EXAMPLE 1

A sample of wastewater already determined to contain low molecular weight poorly adsorbable materials was collected from a pharmaceutical plant and equally divided into two portions. One of the two portions was then biologically treated by contacting the wastewater with activated sludge. The other portion was not biologically treated. The above two sample portions were then further divided into two more equal portions. One sample from each of the two portions was chemically treated with lime sufficient to reach a pH of 12.0. The non-biologically treated sample required 2000 mg./l. of lime while the biologically treated sample required 1500 mg./l. of lime to reach a pH of 12.0. Each of the four samples was then neutralized and passed through four activated carbon columns containing the same amount of activated carbon.

Before introducing the samples into the carbon columns, molecular weight determinations were made using the chromatographic techniques reported in Zuckerman's thesis earlier referred to. The chromatographic results obtained have been reproduced as FIGS. 1–4, inclusive.

The effluent from each of the carbon columns was then analyzed and their respective COD and BOD values obtained. The results are reported in Table II below. The carbon column superficial detention time for the filtered and neutralized samples was 30 minutes, for the hydrolyzed non-biologically treated sample 60 minutes, and for the hydrolyzed biologically treated sample 15 minutes. The effluent qualities reported were determined for samples collected at the 3 and 4 bed volume treated. The conditions of operation and the results obtained are reported in Table II below.

TABLE II

| Chemical treatment Ca(OH)₂ | | Biologically treated | Chromatograph of liquid entering carbon column | Activated carbon effluent quality | |
|---|---|---|---|---|---|
| pH | Mg./l. | | | BOD, mg./l. | COD, mg./l. |
| 8.9 | 0 | No | Figure 1 | 645 | 1,265 |
| 12.0 | 2,000 | No | Figure 2 | 345 | 760 |
| 8.2 | 0 | Yes | Figure 3 | 17 | 65 |
| 12.0 | 1,500 | Yes | Figure 4 | 5 | 26 |

The chromatographic procedure using 2.5 x 45 centimeters column and continuous organic monitoring detection is outlined in the aforementioned Zuckerman Ph.D. thesis on pages 93 to 99 was employed.

From the above table it can be seen that a higher quality effluent can be obtained by subjecting the wastewater to biological treatment prior to hydrolysis and adsorption when the wastewater contains poorly adsorbable materials or fails to meet a minimum effluent standard.

EXAMPLE 2

A sample of municipal wastewater containing low molecular weight poorly adsorbable material was split into two samples. One was treated by the chemical treatment procedure of pH 12 with 375 mg./l. Ca(OH)₂ before neutralization and filtration. The other was treated by biological treatment (aeration overnight) before treatment procedure to pH 12 with 375 mg./l. Ca(OH)₂ before neutralization and filtration.

The chromatographic procedure was performed in accordance with the instruction manual of Waters Associates identified as ALC 201, 202 and ALC/GPC 501, 502 dated October 1970, Framingham, Mass., as modified below, for both the biologically treated sample and the non-biologically treated sample after chemical treatment. Equipment used was the ALC 201, Waters unit equipped with a 3/8" x 24" column containing G-15 Sephadex. The column was packed in $10^{-2}$ M $PO_4^=$ buffered water to pH 7.2. The column is operated in the range of 0.2 to 0.7 ml./min. with $10^{-2}$ M $PO_4^=$ buffered water to pH 7.2. Flow rate calibrations are performed with analysis of each sample. Sample volume used as 1 ml. Operating pressure to pump normal at 200 p.s.i. and 20% stroke. Refractometer is normally operated at 2× attenuation and a water bath temperature of 20.5° C. Recorder normally operated at 0.2 in./min.

Sample is prepared by 0.45 micron filtering and adding phosphate buffer to reach approximately molarity of column elutriant (normally added is 2 ml. of 0.1 M $PO_4^=$ buffered water at pH 7.2 to a 20 ml. sample).

Column effluent is started to be collected in a graduated cylinder. Before sample is injected, a valve is opened to relieve pressure. The 1 ml. sample is slowly injected through Septum, then the chart marker is pushed and the valve is closed. The chart marker is pushed again after approximately 30 ml. are collected in a graduated cylinder and the flow rate is calculated from the volume collected and the distance between the marks. The carbon effluent quality was determined by continuous column testing at 30 minutes superficial detention time. The effluent qualities reported were determined for samples collected at the 4, 6 and 8 bed volumes treated.

TABLE III

| Chemical treatment Ca(OH)₂ | | Biologically treated | Activated carbon effluent quality COD, mg./l., bed volume | | |
|---|---|---|---|---|---|
| pH | Mg./l. | | 4 | 6 | 8 |
| 12.0 | 375 | No | 21 | 28 | 31 |
| 12.0 | 375 | Yes | 16 | 16 | 17 |

This example, as in the previous example, demonstrates the effectiveness and efficiency of the invention and its applicability to municipal as well as industrial wastewater.

EXAMPLE 3

A solution of reagent grade glucose (as soluble low molecular weight organic material) to which 5 milliliters of supernatant from settled wastewater per liter of glucose solution were added to supply the organisms necessary for biological action. The mixture was employed for the following experiment. For this particular rich glucose "wastewater" it was necessary to use an abnormally long biological treatment so that the microorganisms would become acclimated to the rich glucose environment to overcome the initial substrate toxicity.

Sample 1 was adsorbed on activated carbon without prior treatment. Sample 2 was biologically treated by aeration for 36 hours followed by adsorption on activated carbon and Sample 3 was similarly biologically treated by aeration for 36 hours and then hydrolyzed prior to adsorption. For all samples the glucose solution prior to carbon treatment had a COD value on the order of about 1,050 mg./l. prior to filtration and 1,010 subsequent thereto.

TABLE IV

| Activated carbon bed volume | Sample 1, no treatment COD values | Sample 2, biological treatment COD values | Sample 3, biological and hydrolysis treatment COD values |
|---|---|---|---|
| 5–6 | 138 | 138 | 74 |
| 7–8 | 290 | 278 | 126 |
| 9–10 | 434 | 453 | 333 |
| 11–12 | 512 | 538 | 402 |
| 13–29 | 828 | 839 | 774 |

The following chemical treatment sequence was employed for all examples. Samples to be chemically treated were placed in one-liter beakers on a six-position mixer assembly. The mixing assembly was then started at rapid mix rate of approximately 100 r.p.m. The chemicals were then added by pipet from concentrated stock solutions to obtain the desired pH obtained for chemical treatment. Rapid mix continued for one minute after chemical addition; then about 20 minutes of flocculation at 20 r.p.m. followed by approximately 40 minutes of settling. After settling, the supernatant was siphoned out of the one-liter beakers. The supernatant is then neutralized to pH 7.0 with sulfuric acid and 0.45 micron membrane filtered before being used as the chemically treated sample.

A continuous carbon column procedure was performed for all tests using down-flow columns containing carbon. The carbon was granular activated carbon, Filtrasorb 400, 12 x 40 mesh, sold by Calgon Corp., which had been washed and placed in distilled water for one day. Samples of raw and hydrolyzed wastewater were filtered through 0.45 micron membrane filters and neutralized to pH 7.0. The columns were packed with approximately 23 grams of granular activated carbon to bed heights of 10 inches against a head equal to the operating head. After packing, the columns were stabilized and washed with 250 ml. of distilled water fed at 0.5 gallon per minute per square foot (3.6 ml. per minute).

The wastewater samples to be tested were placed in one liter bottles and fed at varying rates, by means of a constant rate pumping apparatus. The feed rates were adjusted to obtain superficial detention times with parallel operation carbon beds of 7.5, 15, 30 and 60 minutes. The first 100 mls. of effluent was collected in a graduated cylinder for flow calibration. At least three 50 ml. samples of effluent were collected for analysis after flow regulation. The effluent COD's reported are an average of the samples collected.

We claim:

1. A process for treating wastewater which contains a soluble organic first fraction at least twenty-five percent by weight of which has an adsorbability on fresh activated carbon of less than 60%, comprising the steps of:
    (a) biologically treating said wastewater for a time sufficient to convert a substantial portion of the poorly adsorbable fraction into a high molecular weight material, and
    (b) hydrolyzing said high molecular weight material into a soluble low molecular weight material which exhibits substantially improved adsorptive properties on fresh activated carbon; and
    (c) contacting said wastewater containing hydrolyzed low molecular weight material with a sorbent material so that a substantial portion of said low molecular weight soluble organic material of improved sorbability is sorbed thereon.

2. A process according to claim 1 wherein said hydrolyzing is carried out until said low molecular weight material has an adsorbability on fresh activated carbon of greater than 80%.

3. A process according to claim 1 wherein said raw and hydrolyzed low molecular weight soluble organic material comprises molecules having molecular weights of less than about 400 and said high molecular weight material comprises molecules having molecular weights greater than about 1200.

4. A process according to claim 1 wherein said sorbent material is selected from the group consisting of activated carbon and biological sorption-oxidation material.

5. A process according to claim 1 wherein said poorly adsorbable fraction is selected from the group consisting of sugars, neutral alpha-amino acids and combinations thereof.

6. A process according to claim 1 wherein said poorly adsorbable fraction is selected from the group consisting of glucose, sucrose, glycine, alanine, serine, N phenyl glycine, and combinations thereof.

7. A process according to claim 5 wherein said poorly adsorbable fraction is also selected from the group consisting of glucose, sucrose, glycine, alanine, serine, N phenyl glycine, and combinations thereof.

8. A process for treating raw wastewater comprising,
    (a) hydrolyzing a raw wastewater sample to convert a substantial portion of high molecular weight soluble material therein into low molecular weight soluble material,
    (b) contacting said hydrolyzed wastewater sample with an adsorbent material to remove soluble material,
    (c) measuring the BOD value of the effluent from Step (b) to determine whether it exceeds a predetermined minimum effluent standard,
    (d) biologically treating said raw wastewater sample when said raw wastewater is below the minimum effluent standard determined in (c), (e) hydrolyzing said biologically treated wastewater, and
(f) contacting the hydrolyzed wastewater effluent from Step (e) with a sorbent material so that the effluent exceeds said minimum standard.

9. A process according to claim 8 wherein the minimum effluent standard is based on a percentage of BOD removal of 80%.

10. A process according to claim 8 wherein said predetermined standard is a minimum BOD of 10 mg./l. or less.

11. A process according to claim 8 wherein the percentage of removal of the soluble organic factor in Step (b) is less than 80%.

12. A process according to claim 8 wherein said predetermined standard is a COD value of 35 mg./l. or less.

13. A technique for determining whether a treatment sequence of biological treatment, hydrolysis and adsorption is applicable to a raw wastewater of unknown composition comprising the steps of,
(a) hydrolyzing a first sample of raw wastewater to convert a substantial portion of high molecular weight soluble materials therein into low molecular weight material.
(b) contacting said hydrolyzed wastewater sample with an adsorbent material to remove soluble material,
(c) measuring the BOD value of the effluent from Step (b) to determine whether it exceeds a predetermined minimum BOD effluent standard,
(d) biologically treating a second sample of said raw wastewater,
(e) repeating Steps (a), (b) and (c) upon said biologically treated second sample, and
(f) then performing said treatment sequence of biological treatment, hydrolysis and adsorption only if the BOD value measured in Step (c) exceeds said predetermined minimum standard and the BOD value measured in Step (e) is less than said predetermined minimum standard.

References Cited
UNITED STATES PATENTS 3,455,820   7/1969   Joyce et al. _____ 210—40

OTHER REFERENCES

Zuckerman, M. M., et al., High Quality Reuse Water By Chemical-Physical Wastewater Treatment, J. WPCF, vol. 42, March 1970, pp. 437–463 (P.O.S.L.).

SAMIH N. ZAHARNA, Primary Examiner

B. CASTEL, Assistant Examiner

U.S. Cl. X.R.

210—40